March 28, 1961 W. STELZER 2,976,846
FLUID MOTOR MECHANISM
Filed Jan. 28, 1960 2 Sheets-Sheet 1

INVENTOR
WILLIAM STELZER
BY John F. Phillips
ATTORNEY

March 28, 1961 W. STELZER 2,976,846
FLUID MOTOR MECHANISM
Filed Jan. 28, 1960 2 Sheets-Sheet 2

INVENTOR
WILLIAM STELZER
BY John F. Phillips
ATTORNEY

United States Patent Office 2,976,846
Patented Mar. 28, 1961

2,976,846

FLUID MOTOR MECHANISM

William Stelzer, Bloomfield Hills, Mich., assignor to Kelsey-Hayes Company, Detroit, Mich., a corporation of Delaware Filed Jan. 28, 1960, Ser. No. 5,294

12 Claims. (Cl. 121—41)

This invention relates to a fluid motor mechanism, and more particularly to such a mechanism especially adapted for use in operating the hydraulic brake systems of motor vehicles.

It has been proposed in a motor of this character to provide reaction to the brake pedal by the employment of a rubber or similar resilient body to which motor piston forces are applied when the motor is energized, and wherein the highly resilient body of material referred to "flows" to provide oppositely acting forces which react against the brake pedal. The resilient elements thus employed usually are of substantial volume and are forced to partake of deformation by flowing around relatively sharp corners, and some of the deformation forces are wasted since the resilient bodies have portions of their surfaces open and are not subject to the application of force thereto or the transmittal of reaction forces therefrom. Moreover, reaction elements of this character have been disadvantageous because of the fact that the weaknesses referred to cause chafing or break-down of the resilient elements. It also has been necessary with such devices to provide full mechanical means for guiding the various elements associated with the resilient elements in their movement to various positions.

An important object of the present invention is to provide a motor of the character referred to which employs a resilient body of small radial cross section and wherein substantially all portions of the effective area thereof are subjected to the motor piston forces or are utilized for transmitting reaction forces.

A further object is to provide a mechanism of this character wherein the resilient element has an operative face to one portion of the area of which motor piston forces are delivered and from the remaining area of which reaction forces are transmitted to the brake pedal, the application of the motor force deforming the resilient element to cause the material thereof to flow in the opposite direction to oppose movement of the brake pedal and of the valve mechanism, thus tending to reduce the power of the booster mechanism.

A further object is to utilize the resilient reaction member as a vacuum seal to prevent loss of fluid between the elements with which it is associated, and to so shape the resilient element that the material thereof is caused to flow the shortest possible distance in transmitting reaction forces, thus maintaining a true reaction proportional to the force generated by the motor piston.

A further object is to form the resilient element as a ring of such shape as to provide the smoothest possible flow of resilient material by eliminating any sharp edges around which the material is forced to flow, thus eliminating any chafing or break-down of the material of the resilient ring.

A further object is to use the resilient reaction ring to maintain the motor piston square with the member to be operated, in this case a master cylinder plunger, thus minimizing any need for guiding various of the motor elements with respect to each other.

A further object is to provide a device of this character wherein the manually operable portion of the valve mechanism is substantially full floating, thus very greatly minimizing the necessity for accurately slidably fitting various elements with respect to each other.

Other objects and advantages of the invention will become apparent during the course of the following description.

In the drawings I have shown one embodiment of the invention. In this showing:

Figure 3 is a detail section on line 3—3 of Figure 2; and

Figure 4 is an enlarged fragmentary axial sectional view of a portion of the deformable reaction ring.

Figure 2:
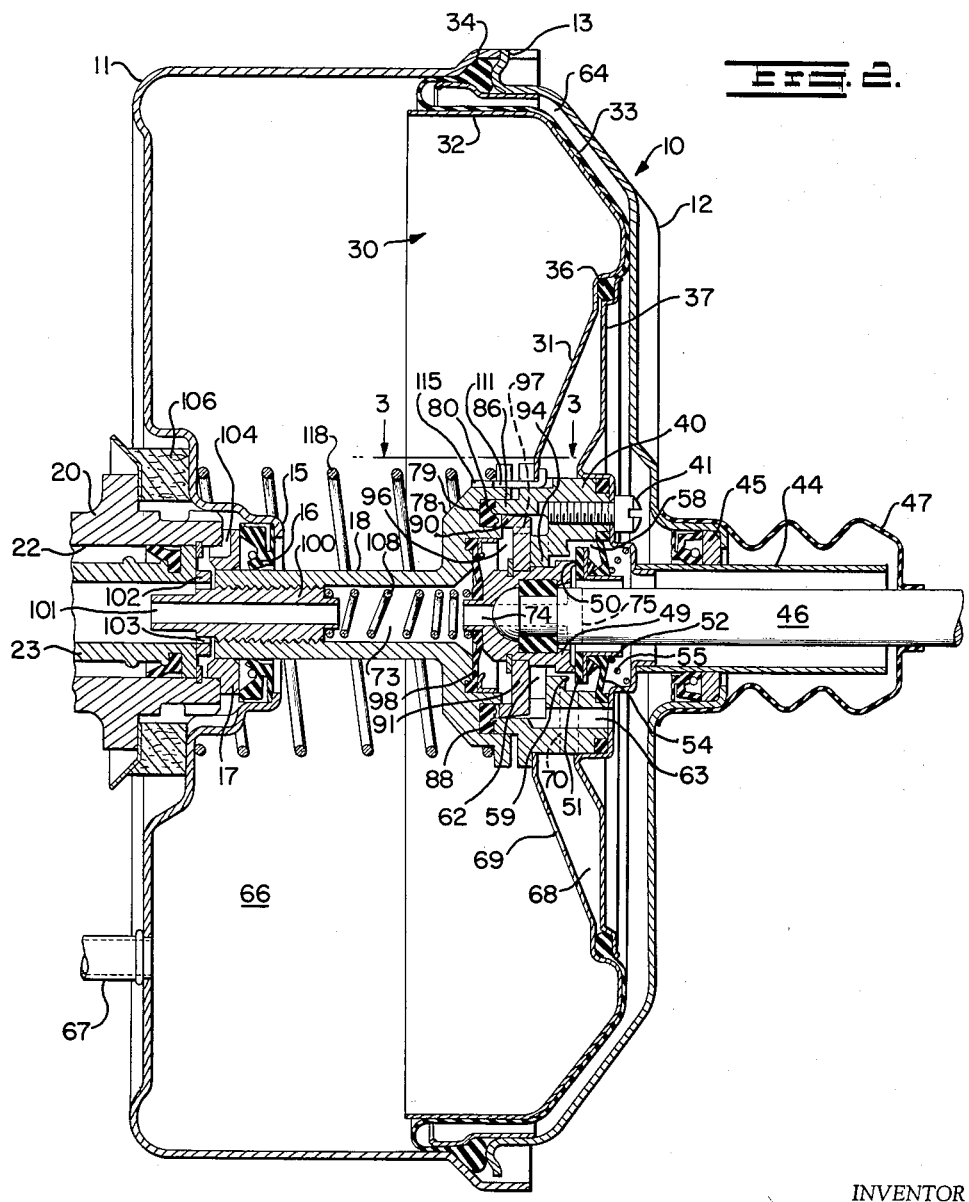
Figure 2 is an enlarged axial sectional view through the motor and associated parts, certain elements being broken away.

Referring to Figure 2, the numeral 10 designates the fluid pressure operated motor as a whole, comprising casing sections 11 and 12 secured together at their peripheries at 13 by any suitable means forming no part of the present invention. The casing section 11 has an inner hub portion 15 in which is arranged a seal 16 abutting a bearing 17 in which is slidable an axial member 18.

Figure 1:
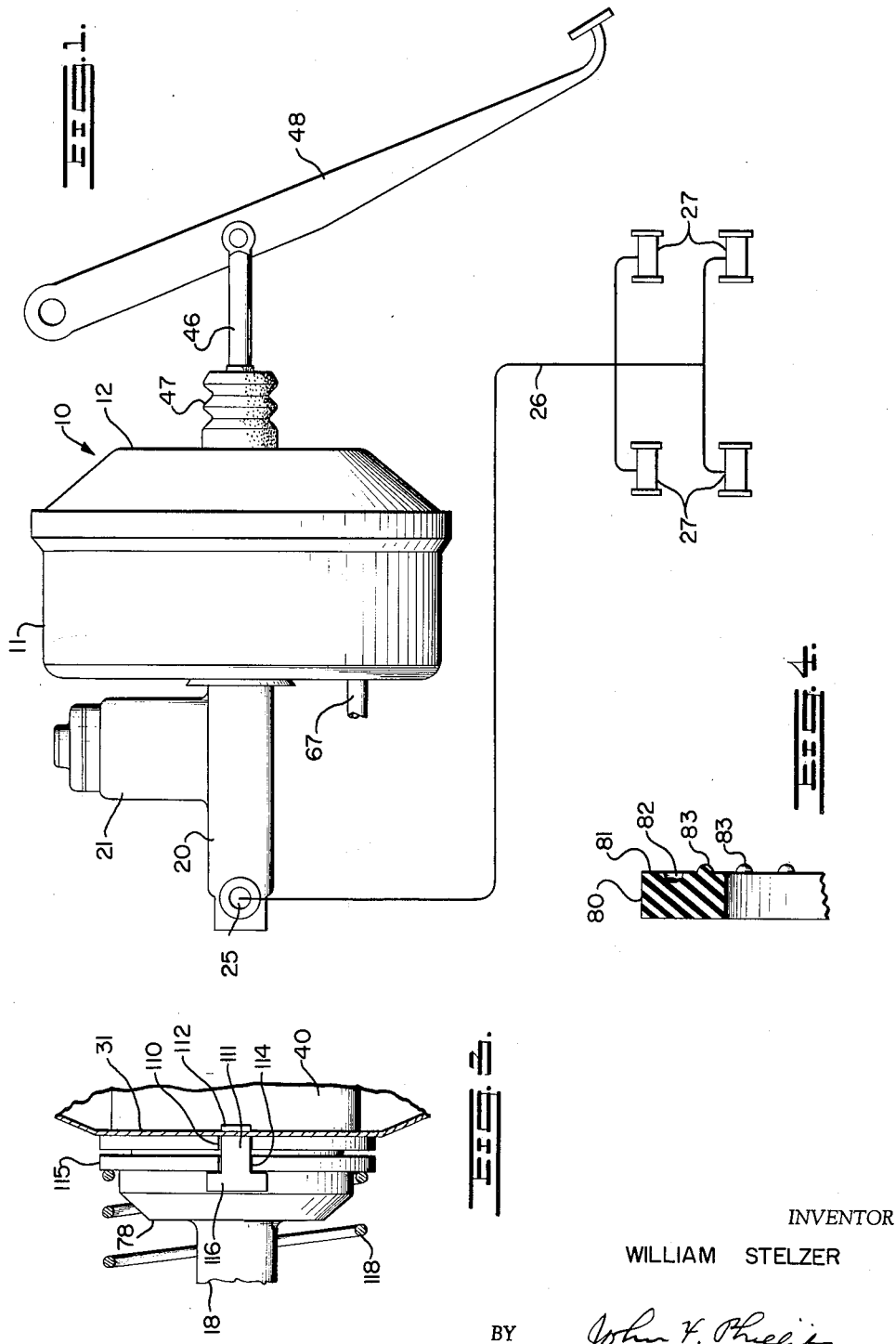
Figure 1 is a side elevation of the motor mechanism with its operating brake pedal, parts of the system being diagrammatically shown.

To the casing section 11 is secured in any suitable manner a conventional master cylinder 20 having the usual reservoir 21 and provided with a bore 22 in which is slidable a fluid displacing plunger 23 operated by the member 18 in a manner to be described. The master cylinder is provided with the usual outlet 25 (Figure 1) connected by lines 26 to the vehicle wheel cylinders 27.

A presure responsive unit indicated as a whole by the numeral 30 is arranged in the motor. This unit comprises a stamped metal body 31, the radially outer portion of which is formed as a flange 3 and over this flange and radially inner portions of the body 31 is arranged a diaphragm 33 having an outer bead 34 clamped between the casing sections 11 and 12. The inner periphery of the diaphragm 33 is provided with a bead 36 clamped against the body member 31 by a plate 37.

Axially of the motor is arranged a preferably cast hub 40 to which the plate 37 is secured as at 41. The inner periphery of the plate 37 is fixed to an axial tube 44, and between such tube and the axially inner portion of the casing section 12 is arranged a combined bearing and sealing unit 45. An operating rod 46 is mounted axially within the tube 44 and the rod 46 is sealed with respect to the casing section 12 by a boot 47. The rod 46 is operable by a conventional brake pedal 48. On the inner or left-hand end of the rod 46 as viewed in Figure 2 is mounted a manually operable member 49 on which is formed an annular valve seat 50 engageable with a disk valve 51 carried by a metal body 52 sealed with respect to the hub member 40 by a diaphragm 54. A spring 55 biases the valve 51 toward the left in Figure 2 to normally maintain the valve engaged with the seat 50.

Around the valve 51, the hub 40 is provided with a chamber 58 and within such chamber the hub 40 is provided with an annular valve seat 59 slightly spaced radially from the valve seat 50 and concentric therewith. The seat 59 is normally disengaged from the valve 51 as shown in Figure 2. The space radially inwardly of the valve seat 59 is in constant communication with a chamber 62, and this chamber is in fixed communication through a passage 63 with the variable pressure chamber 64 of the motor, this chamber being formed between the pressure responsive unit 30 and casing section 12.

The pressure responsive unit 30 and casing section 11 form therebetween a constant pressure chamber 66 to which is connected a nipple 67, and this nipple is connected by a suitable fluid line to a source of vacuum such as the intake manifold of the engine. The space 68 between the body 31 and plate 37 is in full communication with the motor chamber 66 through an opening 69. The space 68, in turn, communicates through a passage 70 with the chamber 58. Accordingly, vacuum is always maintained in this chamber, and with the valve parts in normal position, the chamber 58 communicates through chamber 62 and passage 63 with the motor chamber 64. In the present instance, therefore, the motor is of the vacuum suspended type.

In a manner to be described, the space 73 within the member 18 is in fixed communication with the atmosphere. The inner end of the rod 46 and the axially alined portion of the manually operable member 49 are provided with an axial passage 74 branching through the rod 46 as at 75 to supply atmospheric pressure at all times to the space within the valve seat 59. The latter space in the normal position of the valves is closed by engagement of the seat 50 with the valve 51.

The member 18 is provided adjacent the hub 40 with an enlarged radial flange portion 78. The structure is provided with an annular space preferably in the form of an annular groove 79 in the flange portion 78, having arranged therein a deformable reaction member 80 of soft rubber or other fluent material. The reaction ring 80 is shown in detail in Figure 4, the ring body being generally of rectangular cross section and fitting the groove 79. The ring 80 is provided with a working face 81 in the radially outer portion of which is formed an annular groove 82 for a purpose to be described. At spaced points, the radially inner portion of the face 81 is provided with small projections 83 for a purpose to be described.

The hub 40 is provided with a concentric flange 86 fitting against the radially outer surface of the groove 79 and freely slidable thereover. The extremity of the flange 86 is provided with an annular lip 88 fitting within the groove 82. As described below, motor pressure is delivered by the flange 86 to the reaction ring 80 to cause the material radially inwardly of the flange 86 to flow in the direction opposite to the direction of application of forces to the reaction ring. This reaction force is delivered to the adjacent end of a flange 90, having a tapered outer surface, formed on a reaction plate 91 fixed to the manually operable member 49. This member has a radially inner flange 94 in which the adjacent portion of the manually operable member 49 is loosely slidable so as to substantially float within the mechanism. The reaction plate 91 in its normal position lies against the adjacent face of the flange 94.

To the left of the plate 91 is formed a chamber 96 which communicates with the chamber 62 through an opening 97 formed in the reaction plate 91, and the left side of the chamber 96 is closed by a diaphragm 98 connected between the flange 78 and the manually operable member 49. Thus, the valve mechanism is maintained substantially pressure-balanced.

In the left-hand end of the member 18, as viewed in Figure 2, is threaded a tubular self-locking plug 100 having a passage 101 therethrough communicating with the chamber 73 and with the interior of the plunger 23. The plug 100 is flanged as at 102 for abutting engagement with the plunger 23 to transmit movement to the latter, and the flange 102 is apertured as at 103 to communicate between the interior of the plunger 23 and a groove 104 formed in the bearing 17. This groove, in turn, communicates with the atmosphere through an air cleaner 106 maintained in position between the casing section 11 and the adjacent portion of the master cylinder 20. A spring 108 is mounted between the plug 100 and diaphragm 98 to urge the manually operable member 49 to its normal off position.

At two or more points therearound, the hub 40 is longitudinally grooved as at 110 (Figure 3) to receive the shank portion of a key 111 having an inner upturned finger 112 which engages back of the inner periphery of the stamped body 31. The shank of each key 111 also extends through a slot 114, alined with the slot 110, and formed in the outer periphery of the flange portion 78. The flange portion 78 is provided with a radially outwardly extending narrow flange 115 in which the slots 114 are formed, and to the left of the flange 115 each key 111 is provided with a T-head 116 positioned as shown in Figure 3. The engagement of the fingers 112 of the keys 111 with the stamped body 31 and the engagement of the key heads 116 with the flange 115 prevent longitudinal movement of the members 31 and 78 away from each other beyond their normal positions shown in Figure 2. A return spring 118 engages at one end against the casing section 11 and at the other end against the flange 115, and such spring surrounds the head ends of the keys 111 to prevent such ends of the keys from swinging radially outwardly. The engagement of the keys with the elements referred to permits movement of the member 31 and associated elements to the left in Figure 2 relative to the flange 78 so that the flange 86 may move to deform the reaction ring 80.

*Operation*

The parts normally occupy the positions shown in Figure 2, the valve 51 engaging the seat 50 and being spaced from the seat 59. The air ports 75 thus are disconnected from the chamber 58, and the latter communicates through passage 70 with the space 68 which is always in communication with the motor chamber 66. The latter chamber is always in communication with a source of vacuum through the nipple 67 and the vacuum line connected thereto. Accordingly, the chamber 58 is a vacuum chamber, and with the parts in off positions, such chamber communicates through passages 62 and 63 with the motor chamber 64, and thus the motor is vacuum-suspended.

Operation of the pedal 48 (Figure 1) moves the rod 46 (Figure 2) to the left, thus similarly moving the manually operable member 49 and valve seat 50. The spring 55 causes the valve 51 to follow movement of the manually operable member 49 until the valve 51 engages the seat 59, at which point the valve elements are in lap position. Such operation, of course, takes place solely against the loading of the spring 108, and such movement closes the gap between the flange 90 of the reaction plate 91 and the reaction ring 80. Slight further movement of the manually operable member 49 cracks the valve seat 50 away from the valve 51, whereupon air flows from the ports 75 around the valve seat 50, through passages 62 and 63 into the motor chamber 64 to initiate movement of the pressure responsive unit 30.

In the lap positions of the valve elements, the flange 90 will lightly engage the projections 83 (Figure 4), and movement of the valve seat 50 beyond lap position takes place simultaneously with the slight deforming of the projections 83. Due to the high degree of resiliency of the ring 80, deformation of the projections 83 in the manner described takes place without appreciably resisting movement of the manually operable member 49, but the slight resistance offered to such movement prevents chattering of the valve elements.

Initial movement of the pressure responsive unit 30 transmits force through the flange 86 and reaction ring 80 to the axial member 18 to operate the master cylinder plunger 23 to displace fluid through the brake lines 26 to take up play between the brake shoes and drums. When the brake shoes are expanded to initially engage the drums, movement of the plunger 23 and axial member 18 is resisted, and increased pressure will be exerted against the resilient ring 80 causing the latter to flow in the recess 79, the portion of the ring 80 engaged with the flange 90 then exerting forces tending to prevent movement of the manually operable member 49 by the brake pedal. This resistance transmits reaction to the brake pedal proportional to the force being exerted by the pressure responsive unit and tends to return the valve elements toward normal position. The application of increased force to the brake pedal increases the energization of the motor with a consequent increased application of force from the flange 86 to the reaction ring 80, and the deformation of this ring continues proportionately to increase resistance to movement of the reaction plate 91. All of the forces delivered from the pressure responsive unit to the axial member 18 are transmitted through the reaction ring 80.

Thus it will be apparent that reaction forces are transmitted to the brake pedal in proportion to the motor forces generated in accordance with valve operation, and these forces are accurately modulated. The movement of the parts and the application of the brakes will progress, and approximately at the point where maximum motor energization takes place, the right-hand face of the flange 94 will engage the adjacent shoulder on the manually operable member 49, and the latter will then transmit direct pedal forces to the body 40, the manually operable member 49 and body 40 then moving as a unit to apply their combined forces to the axial member 18. At the same time, pedal applied forces will prevent further flowing or deformation of the material of the reaction ring 80. The total braking forces which can be applied, therefore, will be limited solely by the ability of the operator to apply force to the brake pedal.

The manually operable member 49 and reaction plate 91 constitute control members of the device which substantially float in the mechanism, it being unnecessary to provide an accurate sliding fit between the axial opening in the flange 94 and the manually operable member 49. The control members will be maintained in proper axial position by light engagement of the flange 90 with the inside of the flange 86, assisted by the supporting effect of the diaphragm 98. Because of the tapering of the radially outer surface thereof, the flange 90 engages the inner surface of the flange 86 only along a circular line, thus minimizing friction. The reaction plate 91, in the operation of the apparatus, together with the manually operable member 49, is held square with respect to the body 40 and axial projection 18 by engagement of the flange 90 with the resilient ring 80 during operation of the motor. In the off positions of the parts, the elements referred to are held square by engagement of the right-hand face of the reaction plate 91 (Figure 2) with the flange 94. Movement of the parts to off position is effected by the spring 118 which moves the member 18 and its flange 78, and such movement is transmitted to the hub 40 through engagement of the reaction ring 80 with the flange 86. Such movement of the hub 40 is also assisted by the spring 108 due to engagement of the plate 91 with the flange 94.

It will be apparent that when the apparatus is inoperative, vacuum is present against the right-hand face of the plate 91, whereas when the motor is operating, atmospheric pressure is present at the point indicated. Pressures on opposite faces of the plate 91 are maintained substantially balanced by the provision of the opening 97. The diaphragm 98 seals the atmospheric chamber 73 from the chamber 96, as will be apparent.

It will be noted that the areas of the two flanges 86 and 90 combine to equal the area of the adjacent face of the resilient ring 80. The radially outer face of the flange 86 freely slides over the radially outer face of the groove 79, while the inner face of the flange 90 slides over the inner face of the groove 79. This arrangement has several advantages. In the first place, it permits the use of a relatively small resilient reaction ring 80, and all forces generated due to the deformation of this ring will act against adjacent faces of the flanges 86 and 90. No deformation of the ring 80, therefore, is wasted. Moreover, the arrangement of parts shown and described prevents the flowing of any portion of the ring 80 around any sharp corners, thus avoiding any chafing or wearing of the reaction ring. Moreover, the construction is such as to provide for substantially full floating movement of all manually operable parts, it being unnecessary to provide such parts with friction-creating seals such as O-rings.

The clips 111 assist in the assembling of the device and in the operation thereof. These clips are applied before the placing of the spring 118 in position, by tilting the left-hand end of each clip, as viewed in Figure 2, radially outwardly and hooking the lip 112 behind the adjacent inner edge portion of the body 31, whereupon the clips have their free ends swung downwardly into the grooves 110 and 114. The placing of the spring 118 in position prevents displacement of the clips. These clips permit movement of the body 40 toward the member to be operated, but limit movement of such members away from each other. The device is characterized by simplicity in construction and ease in assembly, and by efficiency in operation, coupled with economy in manufacture.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing, a pressure responsive unit therein having a variable pressure chamber at one side thereof, a member to be operated mounted for movement axially relative to said pressure responsive unit and provided with a space, a resilient reaction element arranged in and filling said space and having an exposed working face, said pressure responsive unit having a portion engaging said working face, a rigid reaction member having a portion engageable with said working face, said portions of said rigid reaction member and said pressure responsive unit having combined areas engageable with said working face substantially equal to the area of the latter, and a valve mechanism normally balancing pressures on opposite sides of said pressure responsive unit and operable for connecting said variable pressure chamber to a source of pressure different from the atmosphere, said valve mechanism having a manually operable member to which said rigid reaction member is connected, whereby operation of said manually operable member to operate said valves moves said portion of said rigid reaction member into engagement with said working face and movement of said pressure responsive unit causes said portion thereof to deform said resilient reaction element to cause it to exert pressure against said portion of said rigid reaction member to oppose valve operating movement of said manually operable member.

2. A motor mechanism according to claim 1 provided with a return spring engaging said member to be operated and acting through said resilient reaction element and said portion of said pressure responsive unit to tend to maintain said pressure responsive unit in normal off position.

3. A motor mechanism according to claim 1 provided with a return spring engaging said member to be operated and acting through said resilient reaction element and said portion of said pressure responsive unit to tend to maintain said pressure responsive unit in normal off position, and means connected between said pressure responsive unit and said member to be operated to limit relative movement thereof away from each other.

4. A motor mechanism according to claim 1 wherein said space is annular and has concentric radially inner and outer surfaces, said portions of said pressure responsive unit and said rigid reaction member being annular flanges coaxial with said space and combining to substantially fill said space radially thereof.

5. A fluid pressure motor mechanism comprising a casing, a pressure responsive unit therein having a variable pressure chamber at one side thereof, a member to be operated arranged coaxially of said pressure responsive unit and mounted for movement axially relative thereto, such member having an annular enlargement provided in the face thereof toward said pressure responsive unit with an annular groove, a resilient reaction element arranged in said groove and having an exposed working face, said pressure responsive unit having an annular flange provided with a free end engaging said working face, a rigid reaction plate having an annular flange provided with an end engageable with said working face, said ends of said flanges combining to form an area substantially equal to the area of said working face, and a valve mechanism normally balancing pressures on opposite sides of said pressure responsive unit, such mechanism being movable from a normal off position to a lap position and then to an operative position connecting said variable pressure chamber to a source of pressure different from the atmosphere, said valve mechanism having a manually operable member to which said reaction plate is connected, said end of said flange of said reaction plate being normally spaced from said working face and movable into engagement therewith when said valve mechanism is in lap position, movement of said manually operable member beyond said lap position moving said end of said flange of said reaction plate more firmly into engagement with said working face and movement of said pressure responsive unit causing said end of said flange thereof to deform said resilient element to cause it to exert pressure against said end of said flange of said reaction plate to oppose valve operating movement of said manually operable member.

6. A motor mechanism according to claim 5 wherein said end of said flange of said reaction plate and the portion of said resilient element engageable therewith constitute a pair of reaction transmitting surfaces one of which is provided with protuberances whereby slight movement of said valve mechanism beyond lap position takes place with limited resistance by said resilient element.

7. A motor mechanism according to claim 5 wherein the portion of said working face engageable by the flange of said reaction plate is provided with spaced projections engageable by said reaction plate in the lap position of said valve mechanism whereby said valve mechanism is movable slightly beyond such position without encountering substantial resistance to movement by said resilient element.

8. A motor mechanism according to claim 5 provided with a return spring engaging said member to be operated to tend to move it to a normal off position, engagement of said resilient element with said flange of said pressure responsive unit transmitting such movement to said pressure responsive unit when said valve mechanism is in normal position.

9. A motor mechanism according to claim 5 provided with a return spring engaging said member to be operated to tend to move it to a normal off position, engagement of said resilient element with said flange of said pressure responsive unit transmitting such movement to said pressure responsive unit when said valve mechanism is in normal position, and means connected between said pressure responsive unit and said member to be operated to provide for movement thereof relatively toward each other and to limit relative movement thereof away from each other at positions in which said flange of said pressure responsive unit remains in engagement with said working face.

10. A fluid pressure motor mechanism comprising a casing, a pressure responsive unit therein having a variable pressure chamber at one side thereof, a member to be operated arranged coaxially with said pressure responsive unit and mounted for axial movement relative thereto, said member to be operated having an annular groove facing toward said pressure responsive unit, a resilient reaction ring filling said groove and having an exposed working face, said pressure responsive unit comprising an axial body provided with an annular flange engaging the radially outer portion of said working face, a reaction plate having an annular flange engaging the radially inner portion of said working face, the combined areas of said flanges engageable with said reaction ring being substantially equal to the area of said working face, and a valve mechanism normally balancing pressures on opposite sides of said pressure responsive unit, and movable to connect said variable pressure chamber to a source of pressure different from the atmosphere, said valve mechanism having an axial manually operable member to which said reaction plate is fixed, and means biasing said manually operable member to a normal off position in which the flange of said reaction plate is slightly spaced from said working face whereby initial movement of said valve mechanism from normal off position first moves said last-named flange into engagement with said working face and then connects said variable pressure chamber to said source of pressure, whereupon force is transmitted by the flange of said body to said resilient ring to deform the latter and transmit reaction therefrom to said reaction plate to resist valve operating movement of said manually operable member.

11. A motor mechanism according to claim 10 wherein said body is provided with a control chamber communicating with said variable pressure chamber, said control chamber being arranged to the side of said reaction plate opposite said member to be operated, said source of pressure being connected to said valve mechanism coaxially through said manually operable member, an auxiliary chamber at the opposite side of said reaction plate, and a sealing diaphragm for said auxiliary chamber connected between said member to be operated and said manually operable member.

12. A motor mechanism according to claim 10 wherein said manually operable member and said body have normally spaced portions engageable with each other after said valve mechanism connects said variable pressure chamber to said source to transmit direct forces from said manually operable member to said body.

No references cited.